UNITED STATES PATENT OFFICE.

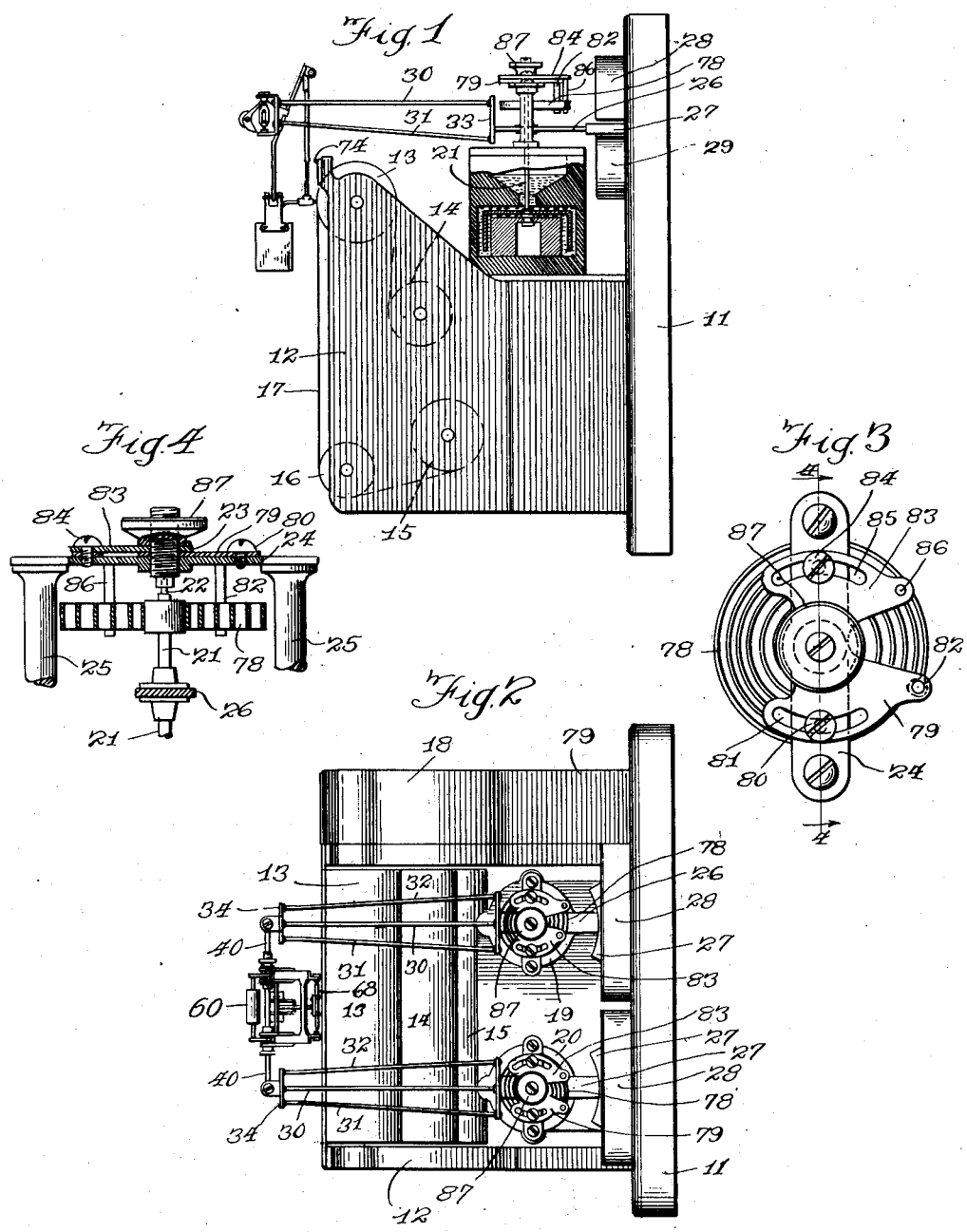

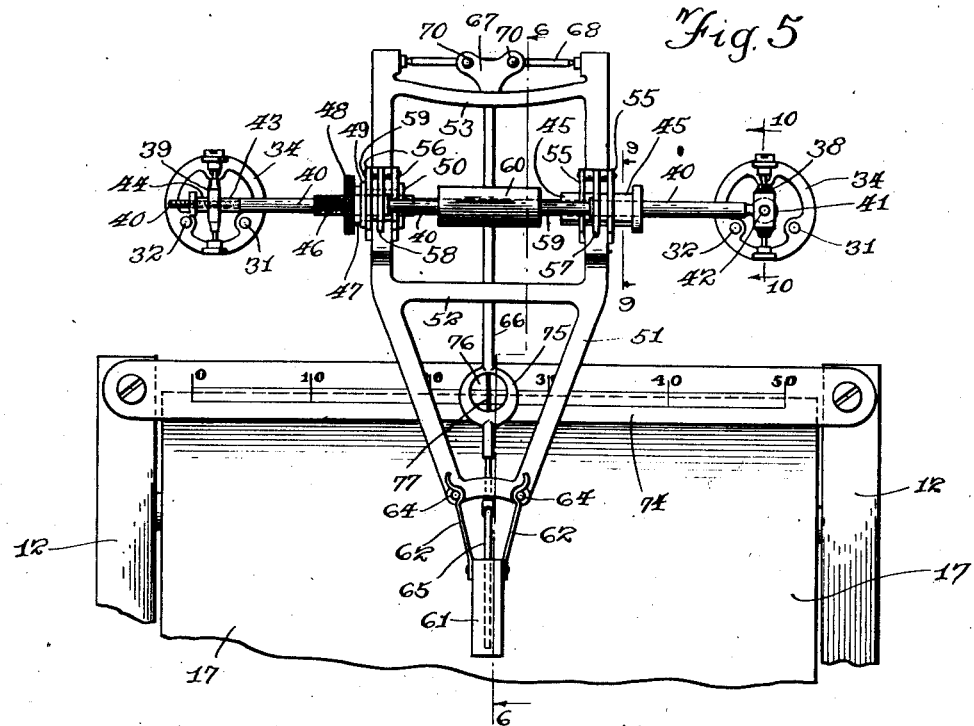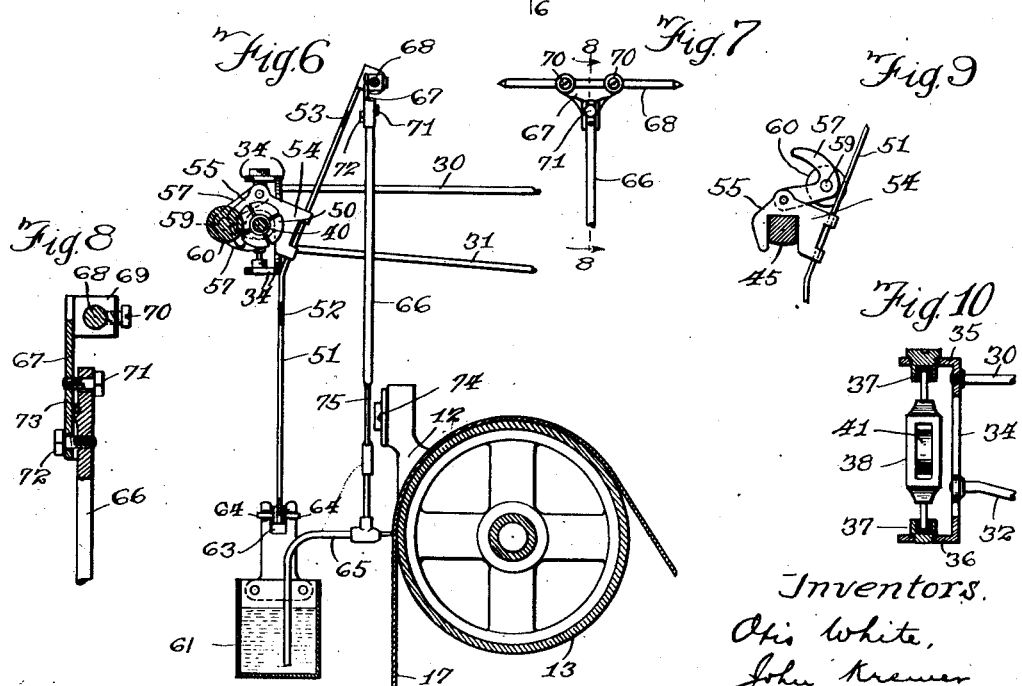

OTIS WHITE AND JOHN KREMER, OF SPRINGFIELD, ILLINOIS, ASSIGNORS TO SANGAMO ELECTRIC COMPANY, OF SPRINGFIELD, ILLINOIS, A CORPORATION OF ILLINOIS.

GRAPHIC RECORDING INSTRUMENT.

1,316,658.   Specification of Letters Patent.   Patented Sept. 23, 1919.

Application filed October 14, 1916. Serial No. 125,731.

*To all whom it may concern:*

Be it known that we, OTIS WHITE and JOHN KREMER, citizens of the United States, and residents of Springfield, in the county of Sangamon and State of Illinois, have invented certain new and useful Improvements in Graphic Recording Instruments, of which the following is a specification, reference being had to the accompanying drawings.

Our invention relates to graphic recording instruments designed to make a record on a moving chart of variations or fluctuations, such as variations of quantity or pressure, in electric circuits. Instruments of that type are shown and described in Letters Patent No. 992,010, granted May 9, 1911, to Robert C. Lanphier, and in an application for Letters Patent filed of even date herewith by Otis White, one of the present applicants, and Herbert W. Young, said application being Serial No. 125,730. Such instruments, generally speaking, comprise means for supporting and moving the chart (usually in the form of a paper ribbon), a device for supporting a stylus or pen in position to make a record on the chart and movable to move the pen across the face of the chart, and mechanism actuated by variations or fluctuations of the force to be measured for moving the pen across the face of the chart. The chart being properly ruled according to a predetermined scale, and the actuating devices being so constructed that a given movement of the pen corresponds with a given variation in the operating force, it will be apparent that the registrations made on the chart will correctly indicate the variations occuring during the period of operation of the instrument. The time factor may, of course, be ascertained and incorporated in the record by moving the chart at a predetermined rate of speed, represented by appropriate rulings on the chart. The improvements which form the subject-matter of our present application have been devised with special reference to their incorporation in and use as a part of a graphic recording instrument constructed as shown and described in said White & Young application, and in the accompanying drawings we have therefore shown them as applied to the same instrument, but it should be understood that the improvements hereinafter claimed are not limited to use only with electrically-actuated graphic recording instruments, or with instruments having the general construction described and claimed in said White & Young application, but may be used for any other purpose for which they are adapted. Such improvements have to do more particularly with the devices for supporting the pen or stylus so that it will move transversely of the chart and be responsive to very slight variations of the impelling force, and with the construction of the pen or stylus and the mounting thereof so that it will coöperate properly with the chart. With regard to the devices for supporting the stylus, our invention has for its object to provide a delicately balanced horizontally swinging support which normally will occupy a neutral position, but when influenced by an impelling force the variations of which are to be measured, it will swing laterally from its neutral position to an extent corresponding with the variations in pressure or quantity of the force by which it is actuated, and consequently at any time will by its position indicate the quantity or pressure of the force then acting upon it, returning automatically to its normal position when the influence of the actuating force is withdrawn. Also to provide suitable devices for adjusting the position of the pen with relation to its support so that it can be properly set at zero or at any desired indication on the chart which may be selected as what may be termed the "base line" or "neutral positic 1." With regard to the pen or stylus, it is our object to provide an ink fed pen which will be automatically supplied with ink from an inkwell and in which the various parts will be so supported that variation in the quantity of ink in the inkwell will not in any manner affect the pressure of the pen upon the chart; also to provide for removing the inkwell independently of the pen and the devices by which it is supported; to provide for removing the pen-supporting devices either with or without the inkwell; and to provide for adjusting the pressure of the pen upon the chart. We accomplish these objects as illustrated in the accompanying drawings and as hereinafter described. What we regard as new is set forth in the claims.

In the accompanying drawings,—

Figure 1 is a side elevation of a graphic recording instrument like that shown and described in said White & Young application, the electrically - operated motor element being partly in section. It may be well to explain that the chart is moved by a separate motor preferably having the contruction shown and described in an application filed of even date herewith, Serial No. 125,733, by Otis White, one of the present applicants, but as such motor forms no part of the invention of this application it is not believed to be necessary to illustrate it;

Fig. 2 is a plan view of the complete instrument;

Fig. 3 is a plan view of the balancing spring, showing the devices for adjusting it and regulating its operation;

Fig. 4 is a vertical section on line 4—4 of Fig. 3;

Fig. 5 is an enlarged detail, being a partial front view of the upper portion of the chart-holding frame and chart, illustrating the pen and pen-supporting devices;

Fig. 6 is a vertical section on line 6—6 of Fig. 5;

Fig. 7 is a detail illustrating the manner of suspending the pen;

Fig. 8 is an enlarged sectional view on line 8—8 of Fig 7;

Fig. 9 is a vertical section on line 9—9 of Fig. 5; and

Fig 10 is an enlarged vertical section on line 10—10 of Fig 5.

Referring to the drawings—

11 indicates the base of the instrument, and 12 a removable chart-holding frame, which is fitted to the base at the front thereof and is removable by drawing it forward away from the base, which remains in position on the wall or other support to which it is attached. The chart-holding frame 12 carries a rotary platen 13, over which the chart passes in a downward direction, a feed-roller 14 which contains a supply of paper ribbon constituting the chart, a rewinding-roller 15, a guide-roller 16 over which the chart 17 passes on its way to the rewinding-roller, and suitable mechanism for operating the rewinding roller synchronously with the platen. The construction which we prefer to use is fully shown and described in said White & Young application. At one side of the chart-holding frame 12 and registering therewith is a housing 18 which is preferably integral with the base and contains the motor by which the platen 13 is driven, this motor being preferably of the construction shown and described in said White application. It will be understood that any other suitable devices for supporting and moving the chart may be employed.

19—20 indicate two electrically-operated motor elements, which are mounted on the base back of the chart-holding frame 12, as best shown in Figs. 1 and 2. These motor elements are of the mercury motor meter type and are alike in all respects. They are each provided with a vertically-disposed armature shaft 21, the upper end of which is provided with a pivot 22 fitting in a jewel bearing in the lower end of a screw 23 which is fitted in a cross-plate 24 supported on pillars 25 at opposite ends thereof, as shown in Fig. 4. The spindle 21 carries a horizontal arm 26 which extends fore-and-aft and has mounted upon its rear end a counterbalance weight 27 which is adapted to oscillate between damping magnets 28—29 secured to the base, as shown in Figs. 1 and 2. At its forward end the arm 26 carries an open-work frame composed of three rods 30—31—32, the rear ends of which are secured to a ring-plate 33 connected to the forward end of the arm 26, their front ends being connected to a ring-plate 34. The ring-plate 34 is provided at its upper and lower margins with lugs 35—36, respectively, which carry adjustable jewel bearings 37. The open-work frames carried by the two arms 26 are alike and are therefore indicated by the same reference numbers. Mounted in the bearings 37 carried by said frames are two vertically-disposed spindles 38—39, respectively, as best shown in Figs. 5 and 10. These spindles support a horizontal bar 40, one end of which is provided with a perforated head 41, as shown in Fig. 5, through which passes a pivot 42 which pivotally connects the bar 40 with the spindle 38 so that its opposite end may swing in a vertical plane. The latter end of the bar 40 extends through a passage in the spindle 39 and is screw-threaded to receive collars 43—44 mounted at opposite sides of the spindle 39, as shown at the left in Fig. 5. Thus, by adjusting the collars 43—44 upon the threaded portion of the bar 40, the spindles 38—39 may be adjusted toward and from each other. 45 indicates a squared portion of the bar 40 disposed at one side of the center thereof, preferably at the side adjacent to the spindle 38, as shown in Fig. 5. 46 indicates a threaded portion of the bar 40 in a corresponding position at the opposite side of the longitudinal center of said bar and preferably of greater diameter than the main portion of said bar. 47 indicates a sleeve mounted upon the threaded portion 46 and thereby adjustable longitudinally of the bar 40. Said sleeve is provided with a knurled head 48 for convenience in rotating it and carries collars 49—50 spaced apart to form a channel.

51 indicates a V-shaped frame, the side members of which are connected by transverse braces 52—53, as best shown in Fig. 5. Said frame is bent intermediately so that the upper portion forms an obtuse angle with the lower portion thereof, as shown in Fig. 6. 54 indicates brackets secured to the inclined upper portions of the side members of the frame 51, as shown in Fig. 6, and provided with hooks 55—56 which are adapted to fit upon the squared portion 45 of the bar 40 and the sleeve 47, respectively. The latter hooks fit between the collars 49—50, as shown in Fig. 5. It will be apparent that by this construction when the sleeve 47 is rotated it will move lengthwise upon the bar 40 and will carry with it the frame 51, since the collars 49—50 will bear against the hooks 56, and consequently said frame will be shifted with the sleeve 47. When this occurs the hooks 55 will slide longitudinally of the squared portion 45. For the purpose of preventing accidental disengagement of the brackets 54 with the bar 40, we provide locking hooks 57—58 which are pivoted, respectively, to the brackets 54 at opposite sides of the frame 51, as shown in Fig. 5, and are adapted to swing down into engagement, respectively, with the squared portion 45 and the sleeve 47, as illustrated in Figs. 5 and 6. These hooks are connected by a rod 59 which carries a counterbalancing weight 60, as best shown in Figs. 5, 6 and 9. The weight 60 holds the hooks 57—58 in operative position, and also, when they are swung back, holds them out of operative position, as illustrated in Fig. 9. At its lower end the frame 51 carries an inkwell 61, which is detachably secured to it by means of spring-clips 62 carried at opposite sides of the inkwell and having slots 63 at their upper ends which are adapted to engage cross-pins 64 carried by the frame 51, as best shown in Figs. 5 and 6. By pressing the clips 62 together until they clear the pins 64, the inkwell is disconnected and may be removed. Preferably the inkwell is rectangular in form, as shown in Figs. 5 and 6.

65 indicates the pen, which is in the form of a very fine tube bent substantially at right angles, as shown in Fig. 6. One end of the pen extends into the ink in the inkwell 61, and its opposite end is arranged in position to apply the ink passing through it by capillary action to the chart. For this purpose the pen is suspended with its upper end opposite the platen 13 and bearing lightly upon the surface of the chart so that as the chart moves a line will be traced upon it. The pen 65 is suspended from the upper portion of the frame 51 by a hanger 66 connected to an arm 67 which is adjustably mounted upon a horizontal pivot 68 by means of blocks 69, so that the pen hangs pendent from said pivot, and may swing toward and from the platen independently of the frame 51. The blocks 69 may be secured in different positions of adjustment longitudinally of the pivot 68 by set-screws 70. The hanger 66 is adjustably connected with the arm 67 by means of screws 71—72 arranged at opposite sides of a rocker 73 provided on the inner face of the hanger 66, near its upper end, as shown in Fig. 8. This rocker bears against the arm 67, and consequently by appropriately adjusting the screws 71—72 the hanger 66 may be held either in parallelism with the arm 67 or may be secured in an angular position relatively thereto. The purpose of this construction is to provide a very fine adjustment of the pressure of the pen upon the chart. It will be apparent that as the hanger 66 is suspended from the pivot 68 and the pen 65 is not connected in any way with the frame 51, but merely dips into the ink in the inkwell 61, as clearly shown in Fig. 6, the pen will bear lightly against the chart, and consequently a very slight modification of the balance of the parts, such as is secured by adjusting the hanger 66 with reference to the arm 67, will modify the pressure of the pen upon the surface of the chart. By thus mounting the pen its action is not affected by the weight of the inkwell, and consequently the consumption of the ink and the refilling of the inkwell have no modifying action upon the line traced by the pen.

As best shown in Fig. 5, the chart-holding frame is provided with a transverse scale 74 arranged horizontally at its upper margin, and for the purpose of indicating accurately the position of the pen on the scale the hanger 66 is provided at a point opposite the scale with an enlarged portion 75 having an opening 76 through which the scale is visible. Extending across this sight opening is a vertical wire 77 which is in the same vertical plane as the opening in the pen, and consequently indicates by its position with reference to the scale exactly the point at which the pen will register. The pen may be adjusted laterally with reference to the frame 51 by loosening the set-screws 70 and adjusting the arm 67 upon the pivot 68, and the position of the frame 51 may be adjusted with reference to the arms 34 by means of the adjusting sleeve 47 in the manner hereinbefore described. It will be understood that the armature shafts 21 do not rotate continuously, but oscillate. The energizing current operates to move the pen in one direction across the face of the chart in opposition to the action of springs 78 which tend to hold the pen in its normal position, or base line, and when the instrument is not in use, operate to return it to such position. One of these springs is mounted upon each armature shaft 21, being connected thereto at its inner end, as best shown in Figs. 2 and 4. These springs are mounted in a manner similar in a general way to the mounting of the hair spring of a watch. Each spring is connected at its inner end to the shaft 21 with which it is associated, its outer end being connected to an arm 79 pivotally mounted upon the pivot screw 23 and adjustably held in position by a set-screw 80 passing through a segmental slot 81 in the arm 79 and into the cross-plate 24, as best shown in Figs. 3 and 4. 82 indicates a pin carried by the arm 79 for connecting the end of the spring 79 thereto. 83 indicates an arm similar to the arm 79 and also pivotally mounted upon the screw 23, and adjustably connected with the plate 24 by a set-screw 84 passing through a slot 85, as shown in Fig. 3. The arm 83 carries a fork 86 which embraces one convolution of the spring 78, between the ends of said spring, the arrangement being such that by adjusting the arm 83 the action of the spring may be modified. 87 indicates a nut, which fits upon the screw 23 and not only serves as a lock-nut for said screw, but also clamps the inner ends of the arms 79—83 in position. By adjusting the arms 79 the normal or zero position of the pen may be varied, and by adjusting the arms 83 the torque of the springs 78 may be adjusted. By providing these two adjustments, therefore, the pen-supporting members may be very accurately balanced and their action equalized so that they operate smoothly and accurately, and the pen will normally return to and remain at its neutral or any other predetermined position when the energizing force is withdrawn. The damping magnets coöperate with the springs 78 and with the electrically-operated motor elements to make the pen-supporting devices operate smoothly, and they also retard their speed, in the latter respect acting in the same way as the damping devices employed in electricity meters.

We have described with great particularity the embodiment of our invention illustrated in the accompanying drawings, but we wish it to be understood that the claims hereinafter made are not to be limited to the specific construction shown and described, except in so far as they are directed to specific features of construction, but are intended to cover generically the features which are broadly new.

That which we claim as our invention, and desire to secure by Letters Patent, is,—

1. A graphic recording instrument, comprising means for supporting a chart, a laterally swinging pen support coöperating therewith, electrically-operated means for swinging said support laterally from its normal position, magnetic damping means acting upon said pen support, and a spring for returning said pen support to its normal position.

2. A graphic recording instrument, comprising means for supporting a chart, a swinging pen support coöperating therewith, a spring for moving said pen support in one direction, means for adjusting said spring to vary the zero position of the pen, and means for moving said support in opposition to the action of said spring.

3. A graphic recording instrument, comprising means for supporting a chart, a swinging pen support coöperating therewith, a spring for moving said pen support in one direction, means for adjusting said spring to vary the zero position of the pen, means for adjusting the torque of said spring, and means for moving said support in opposition to the action of said spring.

4. A graphic recording instrument, comprising means for supporting a chart, a swinging pen support coöperating therewith, a spring for moving said pen support in one direction, means for adjusting the action of said spring to vary the zero position of the pen, and electrically-operated means for moving said support in opposition to the action of said spring.

5. A graphic recording instrument, comprising means for supporting a chart, a pair of electrically-operated motor elements, armature shafts associated therewith, laterally swinging pen-supporting members carried by said armature shafts and connected together in parallelism, damping magnets acting upon said pen-supporting members, and a spring for returning said pen-supporting members to their neutral position.

6. A graphic recording instrument, comprising means for supporting a chart, a pair of electrically-operated motor elements, armature shafts associated therewith, laterally swinging pen-supporting members carried by said armature shafts and connected together in parallelism, damping magnets, a spring for returning said pen-supporting members to their neutral position, and counterbalance weights connected with said pen-supporting members and arranged to be acted upon by said damping magnets.

7. A graphic recording instrument, comprising a base, a damping magnet mounted thereon, an electrically operated motor element mounted on said base in advance of said damping magnet, said motor element having an armature shaft, a laterally swinging member carried by said armature shaft and having an arm extending toward and acted upon by said damping magnet, and oppositely extending means carried by said laterally swinging member for supporting a pen.

8. A graphic recording instrument, comprising a base, damping magnets mounted thereon, electrically-operative motor elements mounted on said base in advance of said damping magnets, said motor elements having armature shafts, laterally-swinging members carried by said armature shafts and having arms extending toward and acted upon by said damping magnets, and oppositely extending means carried by said laterally-swinging members for supporting a pen.

9. A graphic recording instrument, comprising a chart-supporting frame having a stationary transversely-disposed scale at the upper portion thereof, a transversely-swinging pen-support, an electrically operated motor element for swinging said pen support, and a pen carried by said pen-support, said pen-support having a sight-opening for sighting the position of the pen with reference to the scale.

10. A pen-supporting member for graphic recording instruments, comprising an arm, a ring-plate secured thereto at one end thereof, and rods secured at one end to said ring-plate and connected at their opposite ends by a ring-plate parallel with said first-mentioned ring-plate.

11. A pen-supporting member for graphic recording instruments, comprising an arm, a ring-plate secured thereto at one end thereof, rods secured at one end to said ring-plate and connected at their opposite ends by a ring-plate parallel with said first-mentioned ring-plate, and a counterbalance at the opposite end of said arm.

12. A pen-supporting member for graphic recording instruments, comprising an arm, a ring-plate secured thereto at one end thereof, and triangularly-disposed rods secured at one end to said ring plate and connected at their opposite ends by a ring-plate parallel with said first-mentioned ring-plate.

13. A pen-supporting member for graphic recording instruments, comprising an arm, a ring-plate secured thereto at one end thereof, triangularly-disposed rods secured at one end to said ring-plate and connected at their opposite ends by a ring-plate parallel with said first-mentioned ring-plate, and a counterbalance at the opposite end of said arm.

14. A pen-support for graphic recording instruments, comprising a pair of pivotally-mounted parallel members, vertically-disposed spindles pivotally supported by said members, and a cross-bar connected with said spindles.

15. A pen-support for graphic recording instruments, comprising a pair of pivotally-mounted parallel members, vertically-disposed spindles supported by said members, and a cross-bar connected with said spindles and adjustable to vary the distance between the outer ends of said members.

16. A pen-support for graphic recording instruments, comprising a pair of pivotally-mounted parallel members, vertically-disposed spindles supported by said members, and a cross-bar connected with one of said members to swing in a vertical plane and adjustably connected with the other member.

17. A pen-support for graphic recording instruments, comprising laterally-swinging parallel members, a cross-bar supported by said members, a pen-supporting frame and means for detachably connecting said pen-supporting frame with said cross-bar.

18. A pen-support for graphic recording instruments, comprising laterally-swinging parallel members, a cross-bar supported by said members, a pen-supporting frame detachably mounted upon said cross-bar, and means for adjusting said frame longitudinally of said cross-bar.

19. A pen-support for graphic recording instruments, comprising laterally-swinging parallel members, a cross-bar supported by said members, a sleeve adjustably mounted upon said cross-bar, and a pen-supporting frame supported by said cross-bar and engaging said sleeve, whereby by adjusting said sleeve said frame may be adjusted longitudinally of said cross-bar.

20. A pen-support for graphic recording instruments, comprising laterally-swinging parallel members, a cross-bar supported by said members, a screw-threaded sleeve mounted on screw threads on said cross-bar, and a pen-supporting frame engaging said sleeve, whereby by adjusting said sleeve said frame may be adjusted longitudinally of said cross-bar.

21. A pen-support for graphic recording instruments, comprising laterally-swinging parallel members, a cross-bar supported by said members, a pen-supporting frame detachably connected with said cross-bar, means for holding said frame against rocking upon said cross-bar, and a swinging pen carried by said frame.

22. A pen-support for graphic recording instruments, comprising laterally-swinging parallel members, a cross-bar pivotally supported by said members, a pen-supporting frame detachably mounted upon said cross-bar, means for adjusting said frame longitudinally of said bar, and means for preventing said frame from rocking upon said bar.

23. A pen-support for graphic recording instruments, comprising laterally-swinging parallel members, a cross-bar pivotally supported by said members, a sleeve adjustably mounted upon said bar, a pen-supporting frame supported by said bar and engaging said sleeve, whereby by adjusting said sleeve said frame may be adjusted longitudinally of said bar, and means for preventing said frame from rocking upon said bar.

24. A pen-support for graphic recording instruments, comprising laterally-swinging parallel members, a cross-bar pivotally supported by said members, a pen-carrying frame detachably mounted upon said bar, a swinging pen carried by said frame, and means for securing said frame in position.

25. A pen-support for graphic recording instruments, comprising laterally-swinging parallel members, a cross-bar pivotally supported by said members, a pen-carrying frame detachably mounted upon said bar, and a swinging locking member mounted on said frame and adapted to engage said bar for holding said frame in position.

26. A pen-support for graphic recording instruments, comprising laterally-swinging parallel members, a cross-bar pivotally supported by said members, a pen-carrying frame detachably mounted upon said bar, and a swinging member having hooks adapted to engage said bar and hold said frame in position.

27. A pen-support for graphic recording instruments, comprising laterally-swinging parallel members, a cross-bar pivotally supported by said members, a pen-carrying frame detachably mounted upon said bar, a swinging member having hooks adapted to engage said bar and hold said frame in position, and a counterbalance weight carried by said swinging frame.

28. A graphic recording instrument, comprising chart-supporting means, a horizontally-swinging pen-support, an ink reservoir carried by said pen-support, and a pen suspended to swing toward and from the chart and movable independently of said ink reservoir.

29. A graphic recording instrument, comprising chart-supporting means, a horizontally-swinging pen-support, an ink reservoir carried by said pen-support, a pen comprising a tube one end of which extends into said ink reservoir, the other end of said tube being adapted to register on the chart, and means supporting said pen independently of said ink reservoir.

30. A graphic recording instrument, comprising chart-supporting means, a horizontally-swinging pen-support, an ink reservoir carried by said pen-support, a pen comprising a tube one end of which extends into said ink reservoir, the other end of said tube being adapted to register on the chart, and swinging means supporting said pen independently of said ink reservoir.

31. A graphic recording instrument, comprising chart-supporting means, a movable frame, a pen suspended from said frame to swing toward and from the chart, and an inkwell for supplying ink to said pen, said inkwell being mounted in a stationary position on said frame.

32. A graphic recording instrument, comprising chart-supporting means, a swinging frame, a pen suspended from said frame to swing toward and from the chart, and an inkwell having no connection with the pen, said inkwell being carried by said swinging frame.

33. A graphic recording instrument, comprising chart-supporting means, a swinging frame, a pen suspended from said frame to swing toward and from the chart, and an inkwell mounted in a stationary position on said frame and swinging therewith, said pen comprising a tube one end of which extends into said inkwell and the other end of which is adapted to register on the chart.

34. A graphic recording instrument, comprising chart-supporting means, a swinging frame, a pen suspended from said frame to swing toward and from the chart, and an inkwell having no connection with the pen, said inkwell being carried by said swinging frame and detachably connected therewith.

35. A graphic recording instrument, comprising chart-supporting means, a swinging frame, a pen suspended from said frame to swing toward and from the chart, and an inkwell having no connection with the pen, said inkwell being carried by said swinging frame and being detachable therefrom independently of the pen.

36. A pen-supporting device for use in connection with graphic recording instruments, comprising a frame arranged to be applied to or removed from the instrument, an inkwell detachably connected with said frame, and a pen suspended from said frame and communicating with said inkwell, said pen being adapted to swing independently of said inkwell.

37. A pen-supporting device for use in connection with graphic recording instruments, comprising a frame the upper portion of which is disposed at an angle with the lower portion thereof, means disposed intermediately of said frame for connecting it with a suitable support, an inkwell connected with the lower portion of said frame, and a pen suspended from the upper portion of said frame and coöperating with the inkwell.

38. A pen-supporting device for use in connection with graphic recording instruments, comprising a frame the upper portion of which is disposed at an angle with the lower portion thereof, means disposed intermediately of said frame for connecting it with a suitable support, an inkwell connected with the lower portion of said frame, and a pen suspended from the upper portion of said frame and coöperating with the inkwell, said pen being adapted to swing independently of the inkwell.

39. A pen-supporting device for use in connection with graphic recording instruments, comprising a frame the upper portion of which is disposed at an angle with the lower portion thereof, means disposed intermediately of said frame for connecting it with a suitable support, a detachable inkwell connected with the lower portion of said frame, and a pen suspended from the upper portion of said frame and coöperating with the inkwell.

40. A pen-supporting device for use in connection with graphic recording instruments, comprising a frame the upper portion of which is disposed at an angle with the lower portion thereof, means disposed intermediately of said frame for connecting it with a suitable support, an inkwell connected with the lower portion of said frame, a hanger suspended from the upper portion of said frame to swing toward and from the inkwell, and a tubular pen supported by said hanger, one end of said pen extending into said inkwell.

41. A pen-carrying device, comprising a frame, a horizontal pivot mounted in said frame and having a depending arm, a hanger, a pen carried by said hanger, and means for rigidly connecting said hanger with said arm and adjusting their angular relation to each other to vary the position of the pen.

42. A pen-carrying device, comprising a frame, a pivot mounted in said frame and having a rigid arm, a pen carrying hanger having an adjustable rocker bearing on said arm, and means at opposite sides of said bearing connecting said arm with said hanger whereby their angular relation to each other may be varied to alter the position of the pen.

43. In a graphic recording instrument, the combination with a laterally-swinging support, of an inkwell carried by said support, and a pen suspended from said support and movable independently of the inkwell.

44. In a graphic recording instrument, the combination with a laterally-swinging support, of an inkwell carried by said support, and a pen suspended from said support, said inkwell being removable independently of the pen.

45. In a graphic recording instrument, the combination of a laterally-swinging support, a frame carried by said support, an inkwell carried by said frame, and a pen suspended from said frame and adapted to swing independently of the inkwell.

46. In a graphic recording instrument, the combination of a laterally-swinging support, a frame carried by said support, an inkwell detachably mounted on said frame, and a pen suspended from said frame and adapted to swing independently of the inkwell.

OTIS WHITE.
JOHN KREMER.